(12) United States Patent
Hopper et al.

(10) Patent No.: US 8,891,127 B2
(45) Date of Patent: Nov. 18, 2014

(54) PRINT CHANNEL IDENTIFICATION MECHANISM

(75) Inventors: Samuel N. Hopper, Longmont, CO (US); Matthew P. Lampey, Frederick, CO (US); Rose E. Visoski, Louisville, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 255 days.

(21) Appl. No.: 13/223,711

(22) Filed: Sep. 1, 2011

(65) Prior Publication Data

US 2013/0057878 A1 Mar. 7, 2013

(51) Int. Cl.
*G06K 15/10* (2006.01)
*G06K 1/12* (2006.01)

(52) U.S. Cl.
CPC .................................... *G06K 1/121* (2013.01)
USPC .......... 358/1.8; 358/1.15; 358/1.12; 235/375; 235/494

(58) Field of Classification Search
None
See application file for complete search history.

(56) References Cited

U.S. PATENT DOCUMENTS

| 7,134,962 | B2 | 11/2006 | Meyerhofer et al. |
| 7,460,706 | B2 * | 12/2008 | Doumoto et al. .............. 382/167 |
| 2005/0224580 | A1 * | 10/2005 | MacKay et al. .......... 235/462.04 |
| 2010/0165066 | A1 | 7/2010 | Miller |
| 2010/0188671 | A1 | 7/2010 | Ihme |
| 2011/0019208 | A1 * | 1/2011 | Yamaguchi et al. ............ 358/1.2 |
| 2011/0095078 | A1 * | 4/2011 | Price et al. ..................... 235/375 |

* cited by examiner

*Primary Examiner* — Mark Zimmerman
*Assistant Examiner* — Richa Mishra
(74) *Attorney, Agent, or Firm* — Blakely, Sokoloff, Taylor & Zafman LLP

(57) ABSTRACT

A printer includes a print head having a first print channel to print data on each page of a print medium according to a first color plane and a second print channel to print data on each page of the print medium according to the first color plane. The printer also includes a verification unit to generate a first channel identifier to identify data printed by the first print channel and a second print channel identifier to identify data printed by the second print channel.

20 Claims, 3 Drawing Sheets

PRINT CHANNEL IDENTIFICATION MECHANISM

FIELD OF THE INVENTION

The invention relates to the field of printing, and in particular, to verification of data on printed documents.

BACKGROUND

In high-speed continuous form ink jet printing, it is common to create sheets from multiple, independent color planes (e.g., C, M, Y, K) using any one of ink or toner to mark the physical print medium. Thus, it is critical that each of these color planes be printed on the correct sheet and in the correct position to provide the desired output. Similarly, if the printer is configured in a tandem duplex arrangement, the front and back of the sheet must also be in the correct position.

The print data for each of these independent color planes is created inside a rasterizer and forwarded to respective physical ink jets responsible for that particular color. A problem with any one of the independent color planes affects the entire sheet output. Therefore, a barcode is printed at a specific location on the paper for verification by optical scanners.

Because at high speeds scanning time may be too short to check multiple barcodes on one sheet, a common method to accomplish the check is to rotate the independent color planes while printing (e.g., print a 'K' barcode on the first page, an 'M' barcode on the second page, etc.). As a result, all color planes are checked within a short time period. When a problem with a barcode is detected, an operator may inspect the printed output to see what color has failed in order to trouble shoot the physical hardware path (cards, cables, drivers, ink jets).

However, simple operator inspection to determine which color has failed becomes impossible when the colors are the same. For instance, in three engine tandem printing with the third engine includes two color planes of black Magnetic Ink Character Recognition (MICR) ink, or two color planes of black ink in monochrome engines. Accordingly, in such applications it is not possible to determine which physical hardware path has failed simply by inspecting the print output.

Moreover, for a new printer model made from a 4 channel (CMYK) printer that has been converted to two channels of black (monochrome) and two channels of black MICR ink, there is an urgent need to be able to determine which color plane has failed when a barcode detection error (e.g., mismatch in position) occurs.

Without knowing which path has failed (and these failures tend to be intermittent), operators may be faced with the time consuming task of swapping many unnecessary parts in order to isolate the failing component.

Accordingly, a mechanism to identify the origin of data from identical color print channels is desired.

SUMMARY

In one embodiment, a printer includes a print head having a first print channel to print data on each page of a print medium according to a first color plane and a second print channel to print data on each page of the print medium according to the first color plane. The printer also includes a verification unit to generate a first channel identifier to identify data printed by the first print channel and a second print channel identifier to identify data printed by the second print channel Another embodiment discloses a method comprising generating a first channel identifier to identify data printed by a first print channel and generating a second print channel identifier to identify data printed by a second print channel.

BRIEF DESCRIPTION OF THE DRAWINGS

A better understanding of the present invention can be obtained from the following detailed description in conjunction with the following drawings, in which.

DETAILED DESCRIPTION

A print channel identification mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
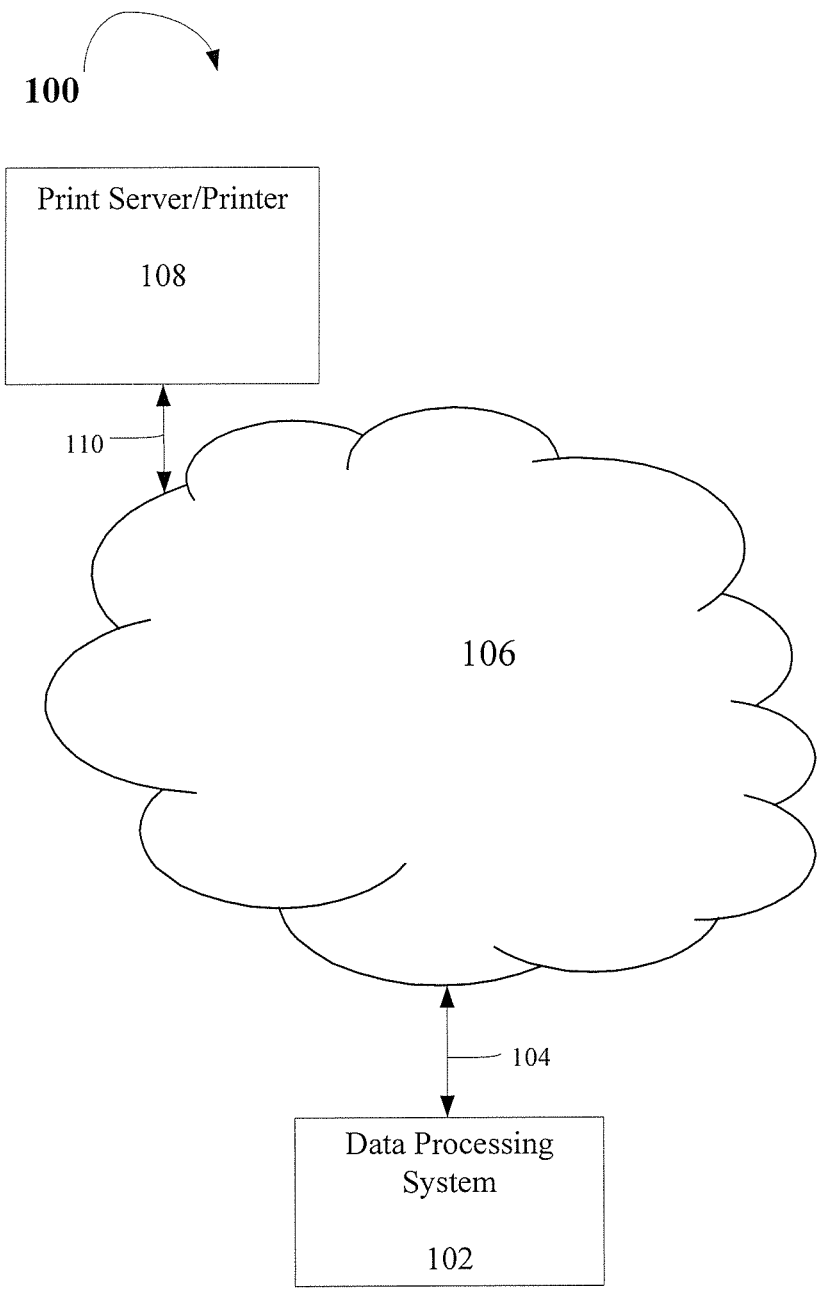
FIG. 1 illustrates one embodiment of a data processing system network.

FIG. 1 illustrates one embodiment of a data processing system network 100. Network 100 includes a data processing system 102, which may be either a desktop, host computer or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems 102. Further, print server/printer 108 includes a control unit to perform operations associated with printing a request.

Although described as incorporated within the same entity, other embodiments may include the print server and the printer as being physically separate components. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

Figure 2:
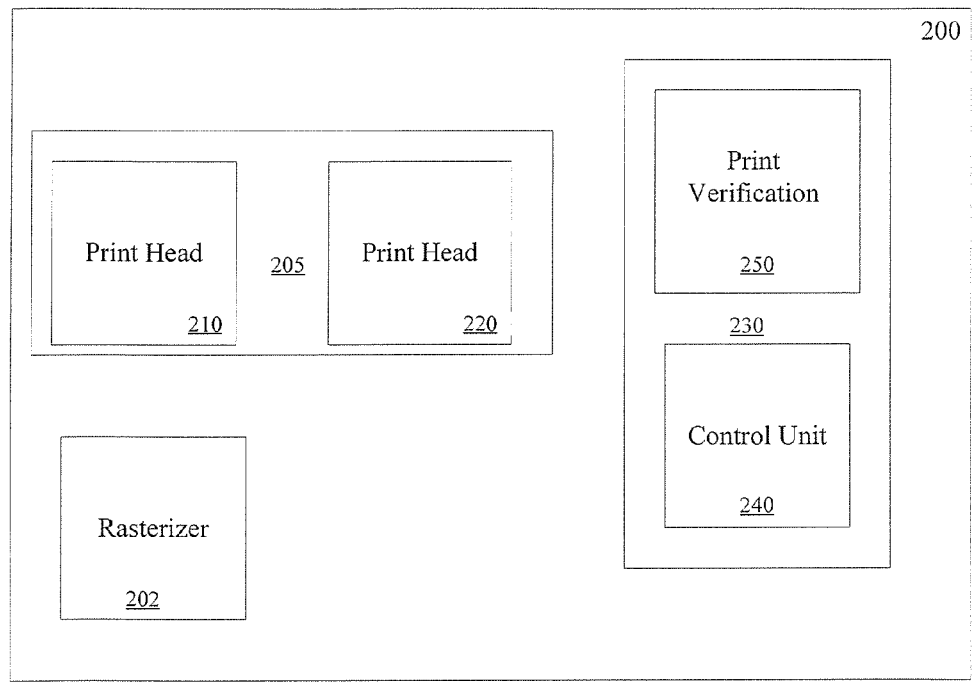
FIG. 2 illustrates one embodiment of a printer.

FIG. 2 illustrates one embodiment of a printer 200. In one embodiment, ink jet printer 200 is implemented as the printing component of print server/printer 108. Printer 200 includes a rasterizer 202, print engine 205, and verification unit 230. Rasterizer 202 performs raster image processing (RIP) of print data objects to convert each page of the data into a bitmap image.

Print engine 205 includes print heads 210 and 220, which include printing elements that print to a print medium (e.g., paper). In one embodiment, print head 210 prints to one side of the medium page, while print head 220 prints to the other. Print heads 210 and 220 each include multiple print channels (e.g., four) that are implemented to print a particular color on the print medium. In a further embodiment, at least two of the print channels print the same color (e.g., two color planes of black MICR ink or two color planes of black ink).

In one embodiment, the pages are provided to the print heads as continuous forms. In a further embodiment, printer 200 includes a mechanism (not shown) between print heads 210 and 220 that turns the paper over as it travels from print head 210 to print head 220. Verification unit 230 includes control unit 240 and print verification unit 250.

Control unit 240 controls the operation of verification unit 230. Thus, control unit 240 facilitates the generation of a unique machine readable identifier that is printed on both the front and the back of each printed sheet at print engines 210 and 220, where each subsequent sheet gets a new barcode machine readable identifier value.

Figure 3:
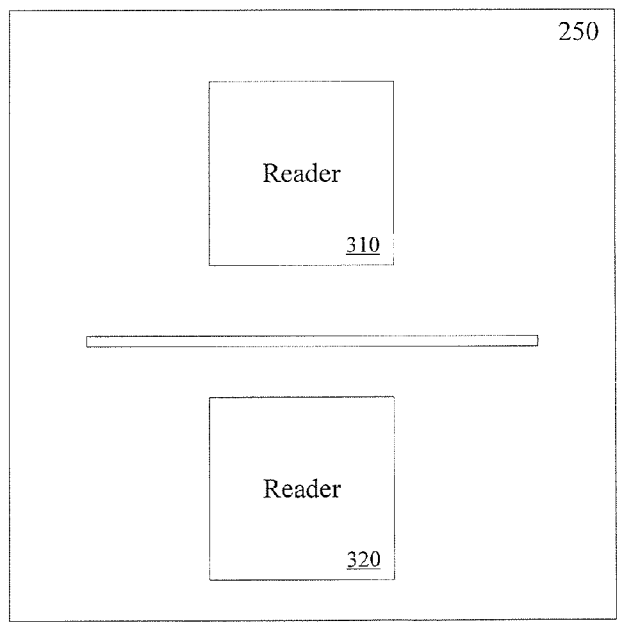
FIG. 3 illustrates one embodiment of a print verification unit.

Subsequently, the machine readable identifiers are read at print verification unit 250. FIG. 3 illustrates one embodiment of a print verification unit 250. Print verification unit 250 includes readers 310 and 320 that are positioned to read the machine readable identifier from each paper side after the paper leaves the print engine 220. The values read by readers 310 and 320 are then compared at control unit 240. If the values are not identical for a given sheet, then there is a side mismatch error and control unit 240 may generate an alarm.

In one embodiment, the machine readable identifiers are barcodes, with barcode scanners being used as readers 310 and 320. In such an embodiment, linear or two-dimensional barcodes may be implemented. However in other embodiments, other types of machine readable code, such as modulated-size marks, may be used.

As discussed above, the implementation of print channels that produce the same color ink makes it difficult to identify which channel has failed upon error detection during verification at side verification unit 230. According to one embodiment, one or more channel identifier notches are added to existing barcode data to identify each particular channel. In such an embodiment, the identifier notches are unobtrusive and do not impact barcode reliability. Additionally, the identifier notches do not clutter the printed page with extra markers, yet allow human observation and quick determination of the print channel of the barcode data without special equipment such as a barcode reader.

According to one embodiment, rasterizer 202 generates the identifier one color plane at a time as the barcode images by producing an additional component of the image based on the color plane (e.g., 1 identifier notch for first color, 2 identifier notches for second color, 3 identifier notches for third color, etc.). As the data progresses from rasterizer 202 to print engine 205, the color plane data becomes separated into the specific hardware path, including the additional image data with the barcode.

Figure 4:
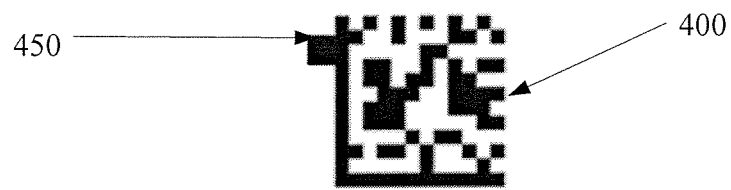
FIG. 4 illustrates one embodiment of a barcode having a channel identifier.

FIG. 4 illustrates one embodiment of a barcode having a channel identifier. As shown in FIG. 4, barcode 400 includes an adjacent identifier 450 used to identify a particular print channel. In this embodiment, of identifier 450 has been enlarged for illustrative purposes. However in an actual embodiment, identifier 450 would not be apparent to a casual observer, and may actually require visual magnification to detect.

According to one embodiment, absence of identifiers at a particular barcode, or absence of the barcode itself, indicates which channel is malfunctioning. For example, if three of the barcodes with corresponding identifiers are apparent, a fourth barcode having no identifiers indicates the malfunctioning channel. In a further embodiment, the identifiers enable an operator to distinguish which channel generated an inaccurate (e.g., fuzzy) barcode. For example, fuzzy print caused by very slight misalignment between separate color planes of the same color may easily pass the barcode inspection provided in FIG. 3, but the simple visual identifier attached to the barcode allows the operator to quickly isolate which color plane has been misaligned.

Although described above with barcodes, other embodiments may be implemented in which identifiers are provided with a constant data object on each page of a document. For example, identifiers may be placed by document page numbers or logo objects that appear on every page.

The above-described mechanism embeds human readable print channel information within or adjoining industry standard barcodes to allow visual interpretation of extra information without impacting reliability or readability of the barcode.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printer comprising:
   a print head having:
      a first print channel to print data on a first side of each page of a print medium according to a first color plane; and
      a second print channel to print data on the first side of each page of the print medium according to the first color plane; and
   a verification unit to generate a first channel identifier to identify the data printed by the first print channel and a second print channel identifier to identify the data printed by the second print channel and to compare the first channel identifier and the second channel identifier to determine if there is a match between the first channel identifier and the second channel identifier.

2. The printer of claim 1 wherein the verification unit generates a first machine readable code for the first print channel and a second machine readable code for the second print channel.

3. The printer of claim 2 wherein the first print channel prints the first channel identifier at least one page of the medium adjacent to the first machine readable code and the second print channel prints the second channel identifier at least one page of the medium adjacent to the second machine readable code.

4. The printer of claim 2 wherein the first print channel prints the first channel identifier at least one page of the medium adjacent to a constant data object and the second print channel prints the second channel identifier on each page of the medium adjacent to the constant data object.

5. The printer of claim 4 wherein the constant data object is a logo object.

6. The printer of claim 4 wherein the constant data object is a page number.

7. The printer of claim 1 wherein the first channel identifier comprises a first number of identifier notches to identify the first channel and the second channel identifier comprises a second number of identifier notches to identify the second channel.

8. The printer of claim 1 wherein the print head further comprises:
   a third print channel to print data on each page of the print medium according to a second color plane; and
   a second print channel to print data on each page of the print medium according to the second color plane.

9. The printer of claim 8 wherein the verification unit generates a third channel identifier to identify data printed by the third print channel and a fourth print channel identifier to identify data printed by the fourth print channel.

10. The printer of claim 1 further comprising a second print head including:
    a third print channel to print data on an opposite side of each page of the print medium according to the first color plane: and
    a second print channel to print data on the opposite side of each page of the print medium according to the second color plane.

11. The printer of claim 3 wherein the machine readable code is a barcode.

12. A method comprising:
    a verification unit generating a first channel identifier to identify data printed by a first print channel a first side of a medium;
    a verification unit generating a second print channel identifier to identify data printed by a second print channel on a first side of a medium; and
    the verification unit comparing the first channel identifier and the second channel identifier to determine if there is a match between the first channel identifier and the second channel identifier.

13. The method of claim 12 further comprising
    printing the first print channel identifier on at least one page of the print medium adjacent to a first machine readable code; and
    printing the second print channel identifier on at least one page of the print medium adjacent to a second machine readable code.

14. The method of claim 12 further comprising:
    printing the first channel identifier on at least one page of the print medium adjacent to a constant data object; and
    printing the second channel identifier on at least one page of the print medium adjacent to the constant data object.

15. The method of claim 14 wherein the constant data object is a logo object.

16. The method of claim 14 wherein the constant data object is a page number.

17. The method of claim 12 wherein the first channel identifier comprises a first number of identifier notches to identify the first channel and the second channel identifier comprises a second number of identifier notches to identify the second channel.

18. The method of claim 12 further comprising:
    generating a third channel identifier to identify a third print channel; and
    generating a fourth channel identifier to identify a fourth print channel.

19. The method of claim 12 wherein the first print channel and the second print channel print data on at least one page of a print medium according to a first color plane and the second print channel and the third print channel print data on at least one page of the print medium according to a second color plane.

20. The method of claim 13 wherein the machine readable code is a barcode.

* * * * *